INVENTOR
Karl R. Komarek

Aug. 30, 1966  K. R. KOMAREK  3,269,611
FEEDING MECHANISM

Filed Feb. 4, 1964  3 Sheets-Sheet 2

INVENTOR
KARL R. KOMAREK

BY *Cushman, Darby & Cushman*
ATTORNEYS

Aug. 30, 1966  K. R. KOMAREK  3,269,611
FEEDING MECHANISM
Filed Feb. 4, 1964  3 Sheets-Sheet 3
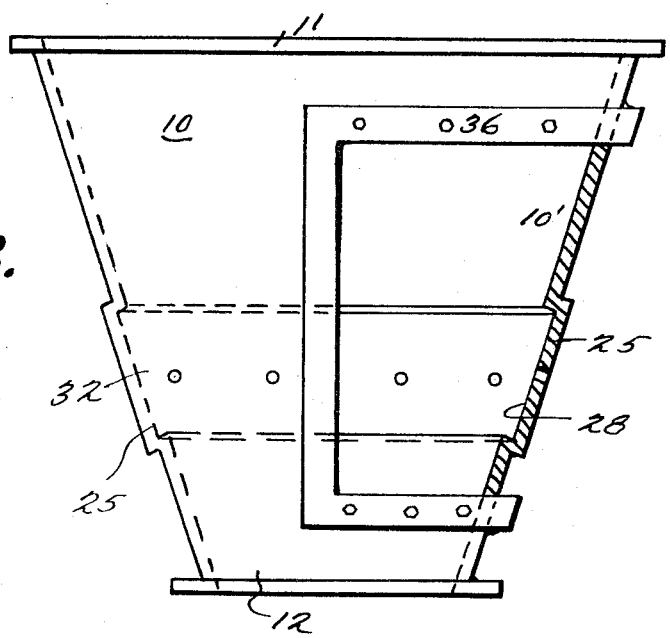
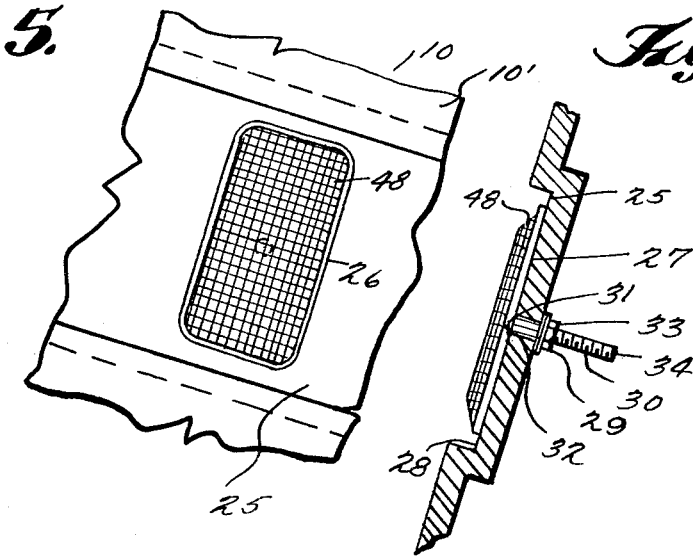
INVENTOR
KARL R. KOMAREK
BY Cushman, Darby Cushman
ATTORNEYS United States Patent Office
3,269,611
Patented August 30, 1966

3,269,611
FEEDING MECHANISM
Karl R. Komarek, Chicago, Ill., assignor to Komarek-Greaves and Company, Chicago, Ill., a corporation of Illinois
Filed Feb. 4, 1964, Ser. No. 342,390
15 Claims. (Cl. 222—189)

This application is a continuation-in-part application of my copending application, Serial No. 145,174, filed October 16, 1961, and now abandoned.

This invention relates generally to a novel feeding means for feeding finely divided material, e.g. ore, flour, minerals and the like and more particularly to an improved feeding means for feeding finely divided materials to the briquetting rolls of a briquetting press.

Feeding means of the type contemplated in the instant invention are commonly employed to continuously feed finely divided material, which is to be briquetted, to the cooperating briquetting rolls of a briquetting press. The finely divided material is received within the mating pockets of the cooperating briquetting rolls where it is pressed into the shape of the pockets to form briquettes, and the finished briquettes are then discharged from the rolls. Generally, such feeding means includes a suitable hopper wherein a rotating feed auger or feed screw means is disposed so as to effect feeding movement of the finely divided material through the hopper and deliver the same uniformly under constant pressure to the briquetting rolls to thereby ensure the formation of consistent high quality briquettes. While such prior art feeding means have been reasonably satisfactory for feeding particulate material having a relatively large particle size, considerable difficulty has been encountered in the feeding of extremely fine particulate material. Satisfactory feeding of such fine particulate material having an extremely small particle size has been difficult, if not impossible, because of the propensity of such small particles to become dispersed in air, causing the material to have a relatively low bulk density and behave similarly to a fluid or liquid and thus resist the effective impartation of feeding movement by the feed screw means. Moreover, the briquetting of extremely fine materials having a relatively low bulk density is not only difficult but also frequently results in briquettes of impaired quality.

Accordingly, a principal object of the present invention is to provide an improved means for feeding finely divided material.

Another object of the present invention is to provide an improved feeding means for feeding particulate material having an extremely small particle size wherein the feeding of such material is enhanced by increasing the bulk density thereof.

A further object of the present invention is to provide an improved feeding means for feeding particulate material having an extremely small particle size wherein the bulk density of the material is increased by removing air from the bulk of material to thereby enhance the feeding properties thereof.

A still further object of the present invention is to provide an improved feeding means for feeding finely divided material to the cooperating briquetting rolls of a briquetting press.

Another object of the present invention is to provide an improved feeding apparatus for feeding finely divided material having a relatively high bulk density to the cooperating briquetting rolls of a briquetting press.

Other objects and advantages of the invention will become apparent from the following description and accompanying drawings in which:

FIGURE 3 is a side view partly in section of the hopper shown in FIGURE 1;

FIGURE 4 is an enlarged fragmentary side view of the filter assembly associated with the hopper walls; and FIGURE 5 is an enlarged fragmentary plan view of the filter assembly shown in FIGURE 4.

Figure 1:
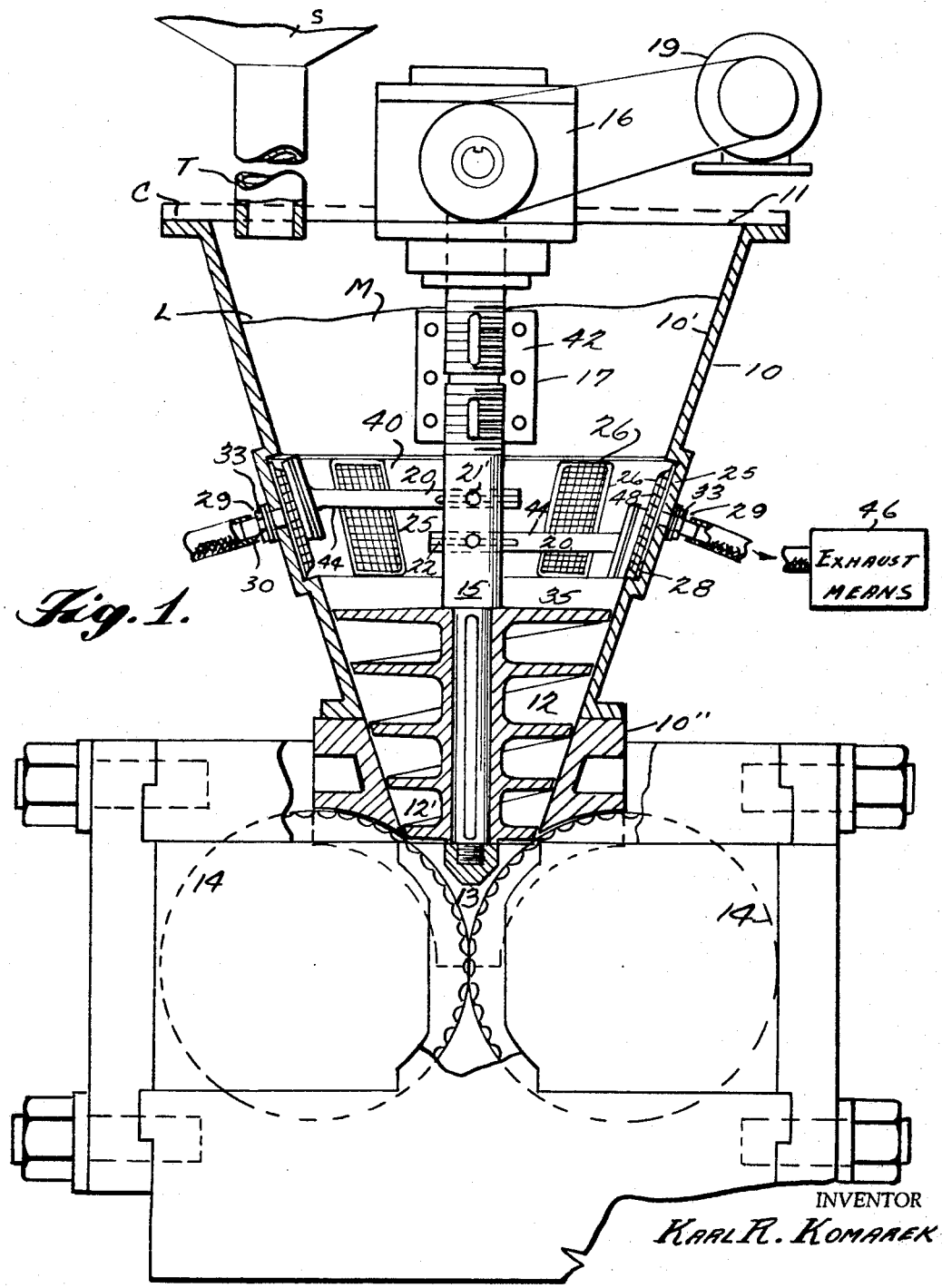
FIGURE 1 is an assembly side view partly in section.

Referring now to FIGURE 1 of the drawings, the numeral 10 indicates a substantially conventionally shaped frusto-conical hopper into which is fed finely divided material M such as fuller's earth. The finely divided material M is continuously introduced at the larger end 11 of the hopper 10 in any conventional manner such as from a suitable material conveyor (not shown) or from a storage bin S through a suitable filling tube T so as to maintain the material M within the hopper 10 at a desired level L above the air expelling or exhaust means 40 to be more fully described hereinafter. If desired, the larger end 11 of the hopper 10 may be closed by a suitable cover C, shown in dotted lines, through which the filling tube T passes. The finely divided material M passes downwardly through the hopper 10 and is delivered from the smaller end 12 of the hopper, in the present instance for purposes of illustration, to and through the continuous conical opening 12' in a base 10'' upon which the hopper is mounted and from this opening 12' into the bight 13 of a pair of conventional briquette rollers 14 mounted in a conventional briquette press for briquette forming rotation.

Figure 2:
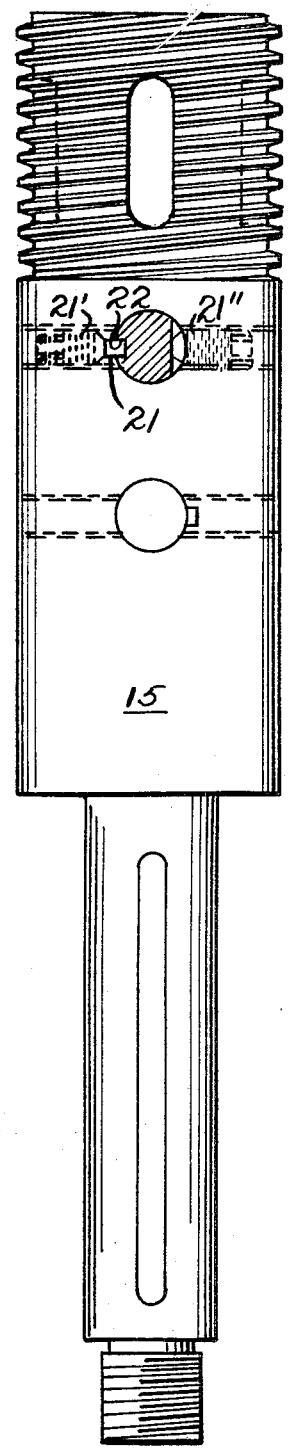
FIGURE 2 is an exploded elevation showing the scraper means in disassembled relation with the scraper means attached to an arm and viewed in side elevation and also with the scraper means partially illustrated, above the same, and viewed in side elevation at 90° from the first side elevational view.
Figure 2:
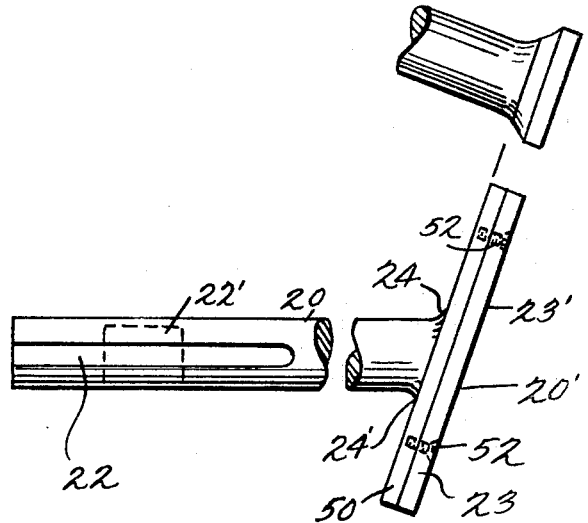

Disposed centrally of the hopper 10 is a vertical shaft 15 rotated by any suitable motor and drive transmitting means 19 acting through a conventional gear assembly 16. The length of the shaft 15 is adjustable with relation to the hopper 10 by any suitable means as, for instance, at the joint 17 through a simple threaded split coupling 42, as best seen in FIGURES 1 and 2. This is primarily to vertically position the scraper means 44 carried by the shaft 15, as well as a screw feeder 35 located in the reduced end 12 of the conical hopper 10 and also carried on the shaft 15, as will be later described and as illustrated in United States Patent 2,977,631.

Carried by the shaft 15 are radially extending scraper means 44, each including scraper carrying arms 20 adjustably fixed to the shaft 15 by means of a key 21 and set screws 21' and 21''. To this end, the stem of each scraper arm 20 is provided on one side with an elongated keyway or key receiving slot 22 and on the opposed side with a set screw receiving slot 22'. Each scraper arm 20 will thus be seen to be retained in operative position by the set screw 21' which will firmly engage the key 21 and retain the key 21 in tight engagement with the key receiving slot 22 and the set screw 21'' which will firmly engage the set screw receiving slot 22'. It will thus be apparent that any desired adjustment of the arms 20 radially of the shaft 15 can be readily effected by merely loosening the set screws 21' and 21'', moving the arms to the desired radial position and thereafter tightening the set screws 21' and 21''. Only one screw is usually necessary such as the set screw 21' in each instance engaging the key 21 on that side of the shaft, as shown in FIGURES 1 and 2.

At their outer ends the arms 20 are provided with scrapers 23 inclined with respect to the stems of the arms in the present instance to conform to the inclination of the conical inner surface 10' of the hopper as shown at 24. The scrapers 23 are secured to the arms 20 in any suitable manner as by means of welds 24', but may be detachably connected as by bolts, screws, etc., so that they may be replaced. The scrapers 23 are so disposed as to have their scraping surfaces 23' conform to the inner wall 10' of the hopper 10 whether the same be inclined as shown, vertical, or have some other peculiar configuration to be engaged by the scraping surfaces 23' to remove material from the wall of the hopper.

While I have illustrated two arms 20 diametrically opposed as shown in FIGURE 1, as many radially spaced arms and associated scrapers 23 may be used as required. Wall 10' of the feeder, in the present instance the inclined wall of the hopper 10 as described, intermediate its ends is provided with a circumferentially extending countersunk recess 25 or a plurality of circumferentially spaced similar recesses (not shown). Into the continuous recess or the spaced recesses, as the case may be, are disposed vacuum pads comprising conventional filter elements 26, as shown in FIGURES 1, 4 and 5, the inner or back surfaces 27 of which engage the adjacent wall surface 28 of the vertically elongated recess wall and are held therein by the threaded nipple and nut construction 29 which is constituted by the tubular nipple 30 fixed to the filter and opening into the filter at the backing 31 thereof. This tubular nipple 30 extends through an opening in the adjacent recess wall as shown at 32 of the hopper 10 where it is externally engaged by the nut 33 to firmly clamp the filter in the recess and to the hopper wall 10' while allowing a hose to be attached to its exposed threaded outer end 34 whereby air can be withdrawn from the hopper 10 through the filter elements 26 and hopper wall be means of any exhaust means 46 such as blowers or suitable compressors of conventional form. The countersunk recess 25, as stated, extends continuously circumferentially of the hopper 10 or the recesses are provided in spaced relation circumferentially about the inner wall 10' of the hopper. Preferably, the recess 25 is continuous, but where spaced recesses are provided they are preferably in alignment circumferentially. In this connection, a continuous circumferentially extending filter member may be disposed in the continuous recess 25 and held therein at spaced points by the clamp construction described, but preferably, the filter elements are disposed, as shown, in circumferential spaced relation in the continuous recess 25 and each filter element is provided with the tube 34 and clamping structure 29 as previously mentioned. The front or exposed surfaces of the filters lie substantially flush with the surface of the inner wall 10' of the hopper as shown in somewhat exaggerated form in FIGURES 1 and 4 for purposes of illustration. The filter elements 26 may consist of fiberglas enclosed on one or the front side by wire mesh 48 and on the other or backside by backing 31, i.e. a metal backing of steel, aluminum, etc. extending also about the sides and overlying the front margin as shown, for instance in United States Patent 2,665,035 to help the wire mesh retain the glass fiber layer to the backing in filtering position.

In operation, incident to the continuous removal of air from the material M in the hopper 10 through the filter elements 26 by the exhaust means 46, some of the fine material M is collected on the outer surface formed by the wire mesh 48 of the filter elements 26. In order to prevent clogging or blocking of the filter elements 26 and the consequent obstruction or stoppage of air flow from the hopper 10, the portion of the material M which collects on the wire mesh 48 is constantly scraped off by the scrapers 23 which engage the outer surface of the wire mesh 48. The material M scraped off the wire mesh 48 by the scrapers 23 falls by gravity, as does the balance of the material M, and is deposited and received on a screw feeder 35 also carried by the shaft 15 at its lower end below the arms 20 carrying the scrapers and the filters 26, as best seen in FIGURE 1. Thus, all the diatomaceous earth or other fine material M, including the portions collected on the filter elements 26, is delivered to the bight 13 between the rotating briquetting rolls 14 by the rotating screw feeder 35 whereby suitable briquettes may be formed. Both the feeding as well as the briquetting of the fine material M is enhanced by virtue of its increased bulk density resulting from the removal of air from the hopper. In this regard, it should be noted that in order that the bulk density of the material M received by the screw feeder 35 be increased by the effective removal of air therefrom, it is essential that the level L of the material M within the hopper 10 be maintained above the filter elements 26.

The operation of the shaft 15 is continuous and the exhaust means externally connected to the tubular nipples 34 which communicate with the filters 26 is therefore also continuously active so that the scrapers 23 will continuously remove the fine material collected on the outer wire mesh surfaces of the filters and deposit the same into the flight of the continuous screw 35 as described. In this manner, there is no exhaust stopping buildup of the material M on the flush filter surfaces and the r.p.m. of the shaft 15 are so controlled as to feed the proper amount of material M to the rolls 14.

In FIGURE 3 the hopper is shown provided with a conventional access door 36 by which access is obtained to the hopper 10 in the usual manner, and in the present case to adjust the shaft 15 or replace worn members such as the scraper means, the filters, etc.

Instead of the briquette rolls, other instrumentalities can be employed to receive and act upon the fines of increased bulk density and it will, therefore, be understood that the invention is not thus limited as belts instead of rolls may be used to form strips and, in fact, a strip of another material may be coated by material delivered from the hopper.

An important consideration of this invention is its wide utility for effectively feeding in a controlled manner finely divided materials such as those described, and the effectiveness of the invention increases in proportion to the relative fineness of the material being fed.

I have described the finely divided material as collecting on the surface of the filter or filters, and it will be understood that the exposed surfaces of the filtering means are substantially flush with the adjacent wall surfaces of the hopper, and the scraper members 23 preferably will be of an area to completely embrace the area of the exposed filter surface.

In the drawings I have shown the hopper as being substantially conical or frusto-conical and the recess therein is, therefore, likewise inclined so that the exposed surface of the filter or filters will be similarly inclined so as to be flush with the adjacent inner wall of the hopper above and below the filter where a continuous recess is provided and on all sides of the filter where the same are disposed in spaced recesses which are similarly inclined. If the hopper wall is vertical, the spaced filters will present a vertical surface to the scrapers and will lie flush with the adjacent wall surface of the hopper. In this manner, the movement of the scraper blades will not be obstructed or retarded and by reason of the adjustment provided for the scraper blades vertically by reason of the adjusting means for the shaft 15 and radially by reason of the adjusting means for the arms 20, it is possible to thoroughly remove all the material collecting upon the surfaces of the filters without unduly abrading the same or the surfaces of the scraper members and at the same time assure substantially complete removal of the finely divided material which has collected upon the inner surfaces of the filters.

Referring to FIGURE 2, the scraping surface 23–23' may be in the form of a doctor blade projecting up from a backing surface 50 secured thereto as by bolts or screws 52.

The filter members 26 may fill completely the recess 25 and, as previously stated, the disclosure in FIGURE 4 at the right hand side is exaggerated in this regard since the spaced apart filters there shown substantially completely fill the recess 25 in the vertical direction to prevent any substantial lodgment of the finely divided material in the circumferential recess 25 or the circumferentially spaced recess, in either of which case the filters are disposed in aligned spaced relation.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. A feeding instrumentality for finely divided material comprising a hopper, a recess in the hopper wall intermediate the top and bottom thereof, a filter in said recess having its inner surface substantially flush with the inner wall surface of the hopper, exhaust means for withdrawing air from said hopper through said filter so as to remove air from said material to thereby increase the bulk density of said material, means for scraping off material which becomes deposited upon said filter, whereby air may be continued to be withdrawn through said filter, and means for delivering said material from which air has been removed from said hopper.

2. A feeding instrumentality according to claim 1 in which the hopper is conical.

3. A feeding instrumentality according to claim 1 in which the filter is detachable.

4. A feeding instrumentality according to claim 1 in which the recess is substantially continuous circumferentially and a plurality of filters are disposed in spaced relation in said recess.

5. A feeding instrumentality according to claim 1 in which the filter wall is provided with a plurality of said recesses in spaced relation to each other with a filter disposed in each recess.

6. A feeding instrumentality according to claim 1 in which the scraping means are mounted upon a rotatable shaft substantially centrally disposed in said hopper.

7. A feeding instrumentality according to claim 6 in which said hopper is conical and said scraping means are inclined to conform to the exposed material collecting surface of said filter.

8. A feeding instrumentality according to claim 1 in which said scraping means are mounted upon a shaft, and which includes means for rotating said shaft within the hopper, and means for adjusting said scraping means both radially and vertically with respect to the hopper.

9. A feeding instrumentality according to claim 1 in which said scraping means are mounted upon a shaft, means for rotating said shaft, a screw feed also rotatably mounted upon said shaft and below said scraping means.

10. A feeding instrumentality according to claim 9 wherein the scraping means are carried in opposed relation by said shaft.

11. A feeding instrumentality according to claim 1 wherein the scraping means have scraping surfaces corresponding to the surface of the filter.

12. A feeding instrumentality according to claim 1 in which the scraping means are mounted upon a shaft centrally disposed with respect to the hopper, means for rotating said shaft, a screw feed disposed below said hopper, means associated with said screw feed for directing material scraped from said filter to the bight of a pair of briquetting rolls, and a pair of briquetting rolls receiving and briquetting said material after the removal of air therefrom.

13. A feeding means for feeding finely divided material comprising in combination: a receptacle means having a first end portion adapted to receive the finely divided material to be fed, a second end portion spaced from said first end portion and adapted to discharge said finely divided material being fed and a side wall connecting said first and second end portions; filter means disposed within said receptacle intermediate said first and second end portions thereof; air removal means communicating with the interior of said receptacle through said filter means so as to remove air from said finely divided material while said filter means prevents removal of said finely divided material therewith; scraping means for removing the material which collects upon said filter means to thereby prevent the stoppage of air flow through said filter means and feed screw means mounted for rotation within said receptacle extending to said second end thereof and adapted to receive the finely divided material from which the air has been removed and feed the same to said second end of said receptacle and effect the discharge of said finely divided material therefrom.

14. The structure defined in claim 13 wherein the filter means are carried by the side wall of said receptacle.

15. For use with an apparatus for feeding finely divided material to the briquetting rolls of a briquetting press of the type including a conical hopper having an open discharge end extending inwardly between the nip of the briquetting rolls, a material receiving opening at its opposite end and a feed screw mounted for rotation within said hopper adapted to receive the finely divided material and feed the same through said discharge opening to said briquetting rolls a device comprising in combination: filter means disposed within the hopper intermediate the material receiving opening and discharge opening thereof; air removal means communicating with the interior of the hopper through said filter means so as to remove air from the hopper, and scraping means adapted to remove the finely divided material which collects on said filter element as a consequence of the removal of air from the hopper, whereby air will be continuously removed from the finely divided material within the hopper to thereby increase the bulk density of said finely divided material so as to facilitate the feeding and discharge thereof by the feed screw to the briquetting rolls.

References Cited by the Examiner

UNITED STATES PATENTS

| | | | |
|---|---|---|---|
| 1,542,119 | 6/1925 | Wheatly | 18—9 X |
| 1,898,355 | 2/1933 | Fickey | 222—189 |
| 2,621,364 | 12/1952 | Stillman | 18—21 |
| 2,644,617 | 7/1953 | Stirn et al. | 222—193 |
| 2,818,199 | 12/1957 | Fain et al. | 222—189 |
| 2,843,789 | 7/1958 | Komarek et al. | 18—21 |
| 2,935,233 | 5/1960 | Vogt | 222—189 |
| 2,985,201 | 5/1961 | Baker | 141—12 |
| 3,114,930 | 12/1963 | Oldham et al. | 18—9 X |

ROBERT B. REEVES, *Primary Examiner.*

WILLIAM J. STEPHENSON, STANLEY H. TOLLBERG, RAPHAEL M. LUPO, *Assistant Examiners.*